United States Patent [19]

Kotthaus

[11] Patent Number: 4,530,623
[45] Date of Patent: Jul. 23, 1985

[54] END CUTTER HEAD, FOR GEAR CUTTING MACHINES, CUTTERS FOR END CUTTER HEADS AND METHOD FOR REFACING SAID CUTTERS

[75] Inventor: Erich Kotthaus, Wallisellen, Switzerland

[73] Assignee: Werkzeugmaschinenfabrik Oerlikon-Bührle AG, Zürich, Switzerland

[21] Appl. No.: 451,442

[22] Filed: Dec. 20, 1982

[30] Foreign Application Priority Data

Jan. 12, 1982 [CH] Switzerland .................. 145/82

[51] Int. Cl.³ .............................. B26D 1/00
[52] U.S. Cl. ............................... 407/22; 407/40
[58] Field of Search ............ 407/22, 21, 25, 40, 407/115

[56] References Cited

U.S. PATENT DOCUMENTS

| 1,820,415 | 8/1931 | Wildhaber | 407/22 |
|---|---|---|---|
| 2,932,239 | 4/1960 | Wildhaber | 407/21 |
| 3,268,981 | 8/1966 | Blakesley | 407/22 |
| 3,487,592 | 1/1970 | Kotthaus | |
| 3,760,476 | 9/1973 | Kotthaus | |
| 4,093,391 | 6/1978 | Bachmann et al. | 407/22 |
| 4,278,370 | 7/1981 | Spear | 407/22 |

FOREIGN PATENT DOCUMENTS

| 888314 | 10/1941 | France . |
| 1069104 | 11/1952 | France . |
| 1230195 | 7/1959 | France . |
| 2364727 | 6/1977 | France . |
| 595946 | 10/1977 | Switzerland . |

Primary Examiner—Leonidas Vlachos
Attorney, Agent, or Firm—Werner W. Kleeman

[57] ABSTRACT

In an end cutter head for a gear cutting machine for fabricating gears by cutting out tooth gaps or slots, cutters are provided for the purpose of increasing the cutting output or rate, which cutters each have two cutting or chip faces. In the method for refacing or regrinding the cutters, the flank clearance surfaces or faces and a top clearance surface or face of each cutter are conjointly refaced with the cutters inserted in the end cutter head which is chucked to a grinding machine.

5 Claims, 14 Drawing Figures

END CUTTER HEAD, FOR GEAR CUTTING MACHINES, CUTTERS FOR END CUTTER HEADS AND METHOD FOR REFACING SAID CUTTERS

BACKGROUND OF THE INVENTION

The present invention broadly relates to an improved end cutter head for gear cutting machines. The invention also relates to an improved cutter intended for use in an end cutter head of a gear cutting machine, said cutter having a top clearance surface or face and two flank clearance surfaces or faces. Furthermore, the invention also relates to a new and improved method for refacing a cutter having more than one cutting face, at least two flank clearance surfaces and a top clearance surface, said cutter being intended for use in an end cutter head of a gear cutting machine.

A prior art end cutter head used to manufacture gears is disclosed in U.S. Pat. No. 1,236,834 and comprises a number of cutters, all of which are located on a circle around the end cutter head axis.

In this known end cutter head the bottom of the tooth gap or slot formed between the teeth of the gear and the flanks of such tooth gap or slot of gear are machined by the same cutting surface or face. Consequently, the cut is not formed cleanly and the cutting output is impaired due to the small rate of feed or advance which is permitted to avoid the occurrence of disturbing vibrations.

A known cutting or milling head for producing curved teeth is dislosed in published German Patent Publication No. 2,600,187 and contains two cutters arranged within each radial slot. One of said cutters serves to produce the inner tooth flank while the other of said two cutters serves to produce the outer tooth flank of the gear.

Both the cutters are arranged one after the other, i.e., in tandem, within the associated tooth slot or space as seen in their direction of movement, and thus, require a greater amount of space. This greater amount of space is required, because each one of the cutters has to be individually retained and because there must be a sufficient distance between the two cutters to enable the cuttings or chips to be carried away.

SUMMARY OF THE INVENTION

It is a primary object of the present invention to provide a new and improved construction of an end cutter head for gear cutting machines and cutters therefor which enables attaining an increased cutting output or rate.

Still a further significant object of the present invention is directed to a new and improved method of refacing cutters in end cutter heads.

Now in order to implement these and still further objects of the invention, which will become more readily apparent as the description proceeds, the end cutter head of the present development is manifested by the features that, the end cutter head comprises a cutter head body and cutters which project from one end face or end surface of said cutter head body, each of these cutters having two cutting faces or surfaces. The cutting faces or surfaces may be inclined with respect to each other. Both of the cutting faces may be bounded at one side thereof by a common separating face or surface. The cutters may also be divided in halves and a cutting or chip face is then associated with each one of said cutter halves.

As already previously indicated, the invention is also concerned with an improved cutter or cutter blade for use in the cutter head of the present invention for cutting gears at a gear cutting machine. The inventive cutter has a top clearance surface or face and two flank clearance surfaces or faces, and two cutting surfaces or faces which are inclined with respect to one another.

The invention also relates to a method for refacing or regrinding a cutter of an end cutter head of a gear cutting machine, wherein the refacing of each cutting surface is accomplished in a separate working step or operation, and thereafter the cutters are inserted into the end cutter head, the end cutter head is clamped or chucked at a grinding machine, one of the respective flank clearance surfaces or faces and the top clearance surface or face are collectively refaced or reground, and thereafter also the other flank clearance surface or face is refaced or reground.

The advantage achieved by the invention essentially reside in the features that in this way an unusually high number of cutters may be mounted at an end cutter head having a predetermined diameter. Thus, less time is required for cutting one or a predetermined number of tooth gaps or slots of gears. Since it is possible in an arrangement including a cutter which is divided into two cutter halves to simultaneously grind such cutter halves, unproductive time periods, during refacing, can be saved by refacing both of the cutter halves at the same time. Additionally, the invention enables the provision of end cutter heads having smaller diameters.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
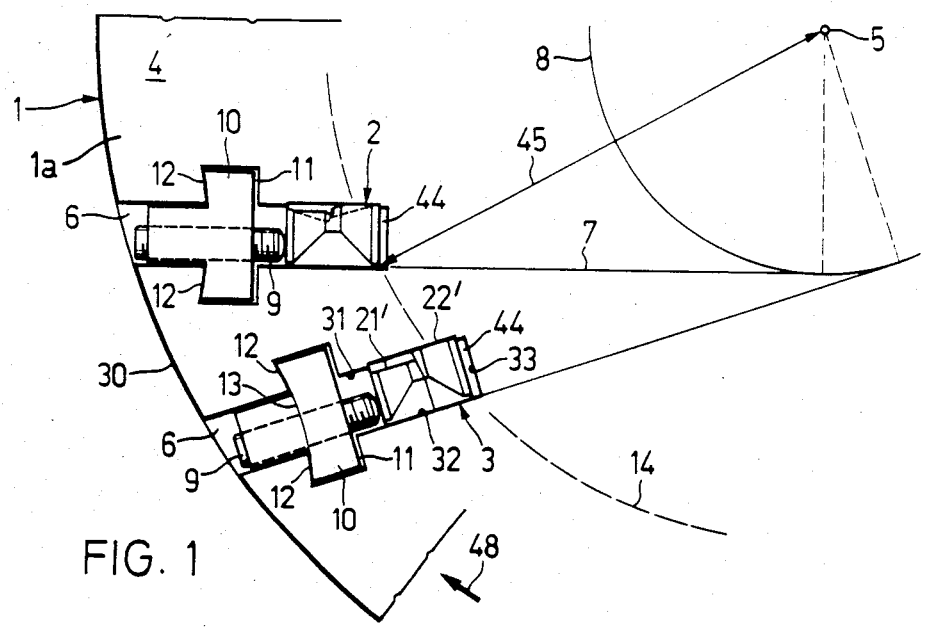
FIG. 1 is a top plan view of part of an end cutter head according to the invention.

Describing now the drawings, it is to be understood that only enough of the construction of the end cutter head and the associated grinding machine has been shown as needed for those skilled in the art to readily understand the underlying principles and concepts of the present development, while simplifying the showing of the drawings. Turning attention now specifically to FIG. 1, there has been illustrated part of an end cutter head 1 in top plan view. As a general rule, the end cutter head 1 i.e., the cutter head body 1a thereof is designed to possess a generally circular shape and supports cutters or cutter blades 2 and 3. For simplicity in the illustration, only two cutters 2 and 3 of a greater number of such cutters are shown, these cutters being placed essentially uniformly along the entire circumference of the end cutter head 1. The cutters 2 and 3 project from an end face or surface 4 of the body or body member 1a of the end cutter head 1 (see FIG. 2). The end cutter head 1 is appropriately journaled for rotation about an end cutter head axis 5 within a suitable gear cutting machine. The cutters or cutter blades 2 and 3 are disposed in slots 6 which are open towards a peripheral face 30 of the end cutter head 1. These slots 6 extend radially from the end cutter head axis 5 in case that the end cutter head 1 is intended for the cutting of gears according to an individual indexing method in which one tooth gap or slot is individually cut after the other.

On the other hand, the slots 6 extend along a tangent 7 to a circle 8 about the end cutter head axis 5 in case that the end cutter head 1 is intended for the continuous cutting of gears in which all of the tooth gaps or slots of the gear teeth are simultaneously produced. The circle 8 also may be designated as the small roll or generating circle.

The cutters or cutter blades 2 and 3 are retained within the slots 6 by means of side faces or surfaces 31 and 32 as well as an end face or surface 33, on the one hand, and by means of screws 9 or the like, on the other hand. The screws 9 are supported at locking devices or bars 10 containing supporting faces or lands 12 by means of which the locking devices 10 are supported against the clamping load of the screws 9 at the end cutter head 1. The supporting faces or surfaces 12 are obtained by machining or otherwise appropriately forming a groove 11 extending transversely with respect to the related slot 6. Preferably, the supporting faces or lands 12 do not form a right angle with the side or lateral faces 31 and 32. More specifically the supporting faces or surfaces 12 are designed so as to possess a slight arrow-shaped or angled configuration, and the tip of the arrow-shape is directed towards the cutters 2, 3. It is particularly favorable to arrange the supporting or support faces or lands 12 along an arc or curved section 13. All of the slots 6 in the end cutter head 1 are of the same shape and are arranged in the same manner, so that the cutters 2 and 3 lie along a circle 14.

Figure 3:
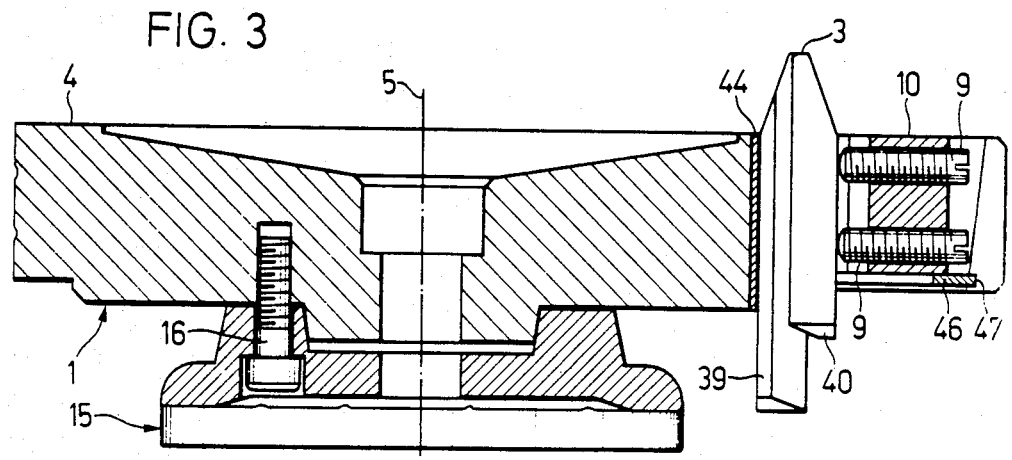
FIG. 3 is a section through the end cutter head shown in FIG. 1.

A section of the end cutter head 1 is shown in FIG. 3. A cutter or cutter blade 3, a locking device 10 and screws 9 or the like retaining the cutter 3 will be recognized in FIG. 3. A mounting or attachment flange 15 serves to mount the end cutter head 1 to a spindle. The mounting or attachment flange 15 is fastened to the end cutter head 1 by means of thread bolt or screw connections 16 of which only one has been conveniently illustrated. Furthermore, spacers or shims 44 are provided to permit adjustment of the distance or spacing 45 (FIG. 1) between the cutters 2 and 3 and the end cutter head axis 5. The locking devices 10 are supported from below by a ring or ring member 46 placed in a groove 47.

Figure 4:
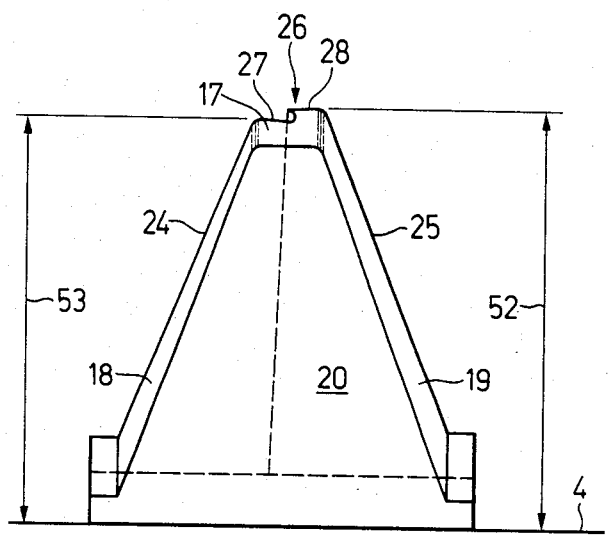
FIG. 4 is a view of a part of the cutter or blade used in the end cutter head as shown in FIG. 1.

In FIG. 4 there is shown part of a cutter viewed from the rear in its direction of movement. A top clearance face or surface 17, two flank clearance surfaces or faces 18 and 19 as well as a rear face or surface 20 will be recognized in FIG. 4. Only that part of the cutter has been shown which projects above the end face or surface 4 of the end cutter head 1. For simplicity, those parts of the cutter which, for example, serve to fasten the same and are positioned below the end face 4 are not shown in the drawing to simplify the illustration.

Figure 5:
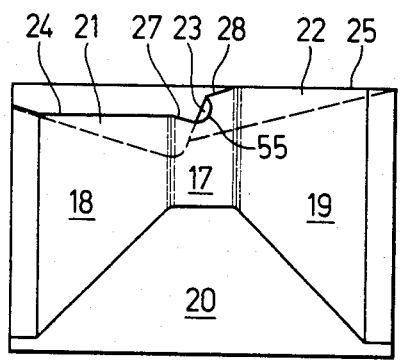
FIG. 5 is a top plan view of the cutter shown in FIG. 4.

FIG. 5 shows the same cutter or cutter blade in a top plan view, that is perpendicular to the end face or surface 4.

Figure 6:
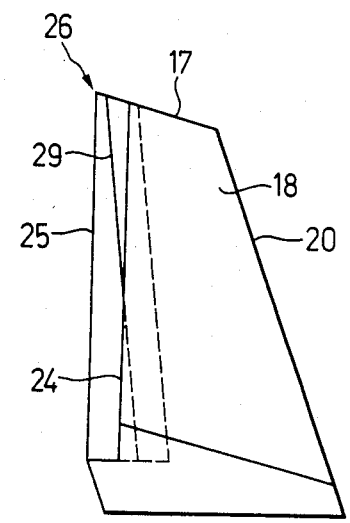
FIG. 6 is a side view of part of the cutter shown in FIG. 4.
Figure 7:
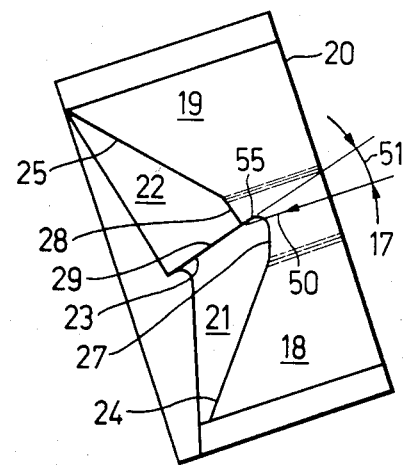
FIG. 7 is a somewhat perspective and top plan view of the cutter shown in FIG. 4.

A side view of the cutter as viewed in the longitudinal direction of the slot 6 is shown in FIG. 6. The same cutter is shown in FIG. 7, but this time viewed in parallel to the rear face or surface 20. In this way there are additionally visible two cutting faces or surfaces 21 and 22, two cutting edges 24 and 25 as well as a top cutting edge 26 (see FIGS. 4 and 6) having two sections 27 and 28. A separating or separation face or surface 23 delimits or bounds the cutting faces or surfaces 21 and 22 and, according to FIGS. 6 and 7, forms a further cutting edge 29 with the cutting face 22 which is displaced in advance of the cutter direction of movement. Preferably, the transition or transition location 55 between the cutting face 21 and the separating face or surface 23 is rounded.

Another embodiment of cutter or cutter blade intended for use with an end cutter head of a gear cutting machine is shown in FIGS. 8 to 11 which correspond in their views to those of FIGS. 4 to 7, respectively. There are also provided for such cutter the cutting faces or surfaces 21' and 22', flank clearance surfaces or faces 18 and 19, and a top clearance surface or face 17. However, here the separating face or surface 23' divides the entire cutter into two cutter halves or portions 34 and 35.

Figure 12:
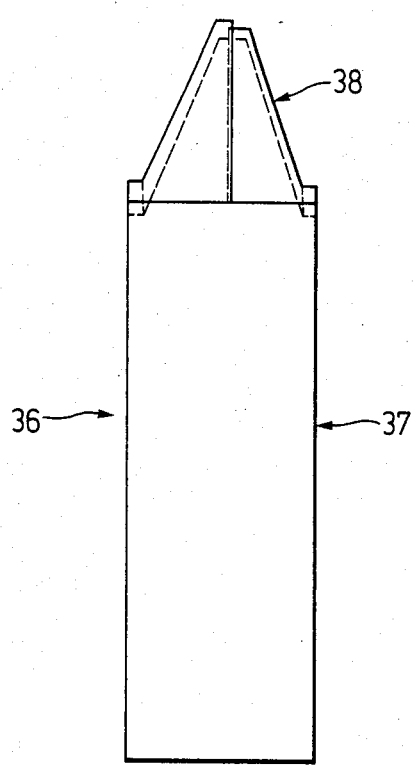
FIG. 12 shows a front view of a further embodiment of a cutter intended for use with the end cutter head as shown in FIG. 1.

FIG. 12 shows the entire length of a bar or rod-type cutter 36. The bar or rod-like cutter 36 has a prismatic shank or shaft 37 which forms at the top or upper region thereof a cutter 38 having cutting faces or surfaces and clearance surfaces or faces.

Figure 13:
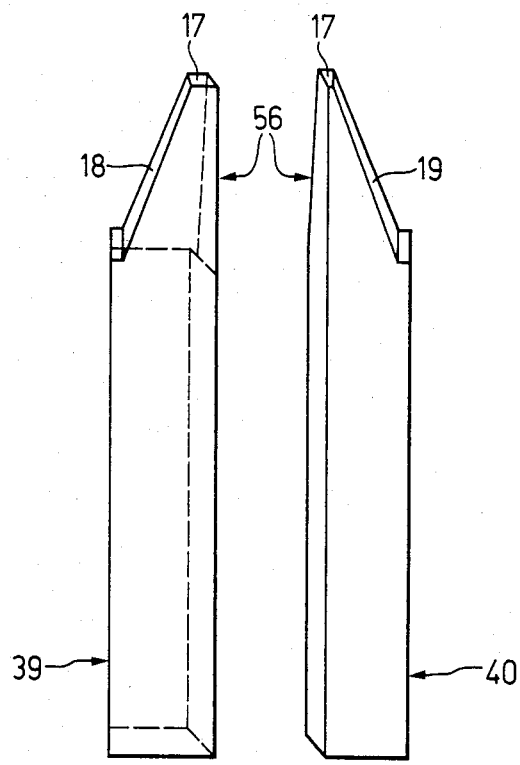
FIG. 13 shows, partially in perspective, the two cutter halves of a cutter or cutter blade according to a still further embodiment of a cutter for use with the end cutter head shown in FIG. 1.

The two cutter halves 39 and 40 which together, when mounted in a slot 6, form a bar or rod-like cutter 36, are shown in FIG. 13. Each of the two cutter halves 39 and 40 has a cutting or cutter head 56.

In the event that the end cutter head 1, for example, is equipped with the bar or rod-like cutter 36 of the type shown in FIG. 12 or 13, then the slots 6, instead of extending normally or perpendicular with respect to the end face 4, may also extend at an angle or at an inclination with respect to the end face 4. In such case the bar or rod-like cutters inserted into the slots 6 will have to be readjusted, not in parallel, but obliquely with respect to the end cutter head axis 5.

Figure 14:
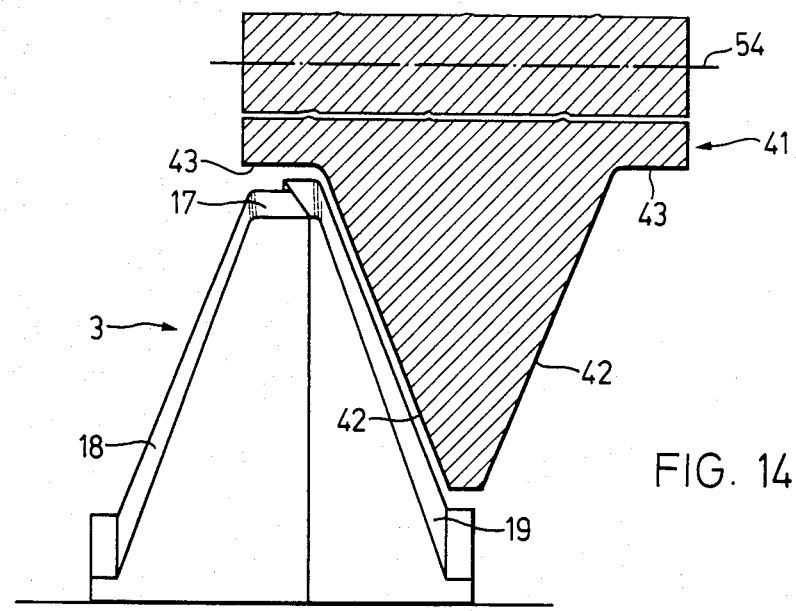
FIG. 14 is a view of the cutter as shown in FIG. 8 in its operative association with a grinding wheel for regrinding or refacing of such cutter.

FIG. 14 shows a cutter 3 with an associated grinding wheel 41 in sectional view. Such grinding wheel 41 is equally suitable for grinding the top clearance surface or face 17 as well as the flank clearance surfaces or faces 18 and 19. For that purpose the grinding wheel 41 comprises two substantially frustro-conical grinding faces or surfaces 42 as well as two substantially cylindrical grinding faces or surfaces 43. The grinding wheel 41 is appropriately conventionally journaled for rotation about an axis 54.

For mounting or installing the cutters 2 and 3 as well as the other cutters here not shown in detail, the screws 9 or the like will have to be first sufficiently loosened. Then, for example, a bar or rod-type cutter, such as cutter 36, which may comprise two cutter halves 39 and 40, is introduced into each slot 6 of the end cutter head 1 shown in FIG. 3. Simultaneously therewith a spacer element or shim 44 or the like is introduced where required. Consequently, the distance 45 from the end cutter head axis 5 can be precisely maintained. The screws 9 are then tightened. The reaction forces thus generated cause the locking device 10 to deform in the direction of the transversely extending groove 11. Due to the arrangement of the supporting faces 12 depicted in FIG. 1, the deformation of the locking device 10 is controlled in such a way that such locking device 10 does not bind or become undesirably clamped in the transversely extending groove 11. This means that during the subsequent loosening of the screws 9 the locking device 10 will not remain in a clamped or binding position, and thus, can be readily removed, so that cleaning of the slot 6 is facilitated. The cutting edges of the cutters are precisely positioned in a direction which is parallel to the end cutter head axis 5. This is done in a known manner conventionally used with other end cutter heads, and thus, does not here require any further description.

Figure 2:
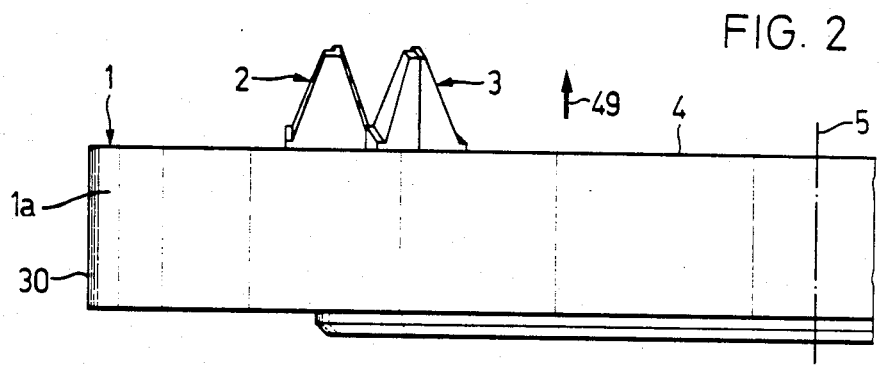
FIG. 2 is a side view of part of the end cutter head shown in FIG. 1.

During the cutting of the tooth slots or gaps of gears at a gear blank, the end cutter head 1 in the gear cutting machine is rotated about the end cutter head axis 5 in the direction of the arrow 48 (see FIG. 1). Additionally, the end cutter head 1 is advanced or fed in the direction of the arrow 49 (see FIG. 2). Thus, the cutters first contact the gear blank with the top cutting edge 26. However, as to such top cutting edge 26 it is firstly only the section 28 thereof which will make contact, because this section 28, which is formed by the cutting face or surface 22 which is advanced or forwardly arranged in the direction of movement, has a greater distance 52 from the end face 4, due to the inclination of the top clearance surface or face 17, than the distance 53 of the section 27 of the top cutting edge 26 has from this end face 4 (see FIG. 4). Therefore, during the first contact of the section 28 with the gear blank, such section 28 will generate a cutting or chip which is produced by three different cutting edges, namely, the top section of the cutting edge 25, the section 28 of the top cutting edge 26, and the top section of the cutting edge 29.

When the cutters later penetrate deeper into the gear blank, a cutting or chip also will be formed by the section 27 of the top cutting edge 26 together with the top section of the cutting edge 24. By virtue of such arrangement of the top cutting edge 26 and the cutting edge 29 two different cuttings are generated, namely, one substantially by the action of the cutting face or surface 21 and another one substantially by the action of the cutting face or surface 22. Both these cuttings cleanly separate and are cleanly removed from the bottom of the tooth space or slot of the gear which is being manufactured. It is important to note in this respect, that the separating or separation face 23 together with the direction of movement 50 includes or forms a clearance angle 51 (see FIG. 7).

Clearly, such cutters also may be mounted at end cutter heads of other than circular configuration, for example at four-cornered, such as at rectangular end cutter heads as well as to end cutter heads which are not arranged to rotate about an axis, but which follow a different path of movement.

In refacing or regrinding the cutters two mutually independent methods can be used, depending upon whether the cutter to be refaced is formed of one piece or is composed of two cutter or blade halves.

Figure 8:
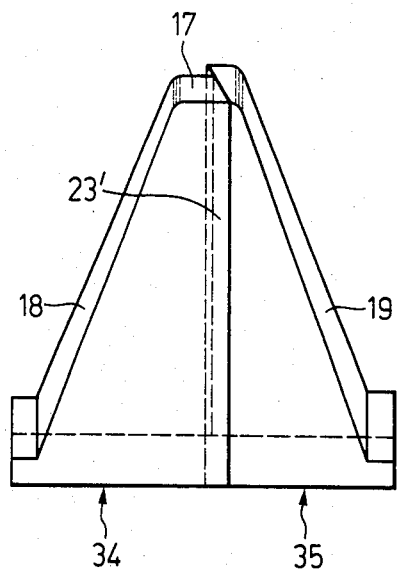
FIG. 8 shows a view of a part of another embodiment of a cutter or blade for use with the end cutter head shown in FIG. 1.
Figure 10:
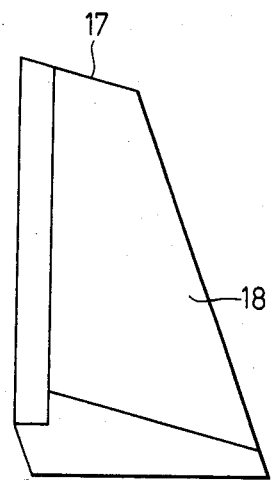
FIG. 10 is a side view of one half of the cutter as shown in FIG. 8.
Figure 9:
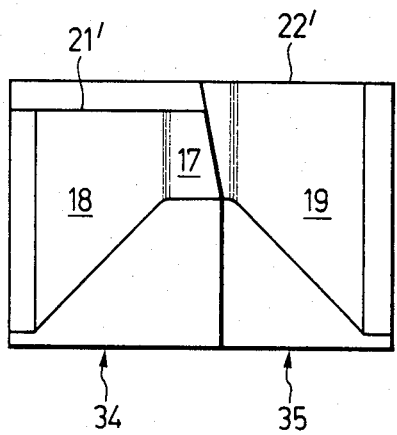
FIG. 9 is a top plan view of the cutter as shown in FIG. 8.
Figure 11:
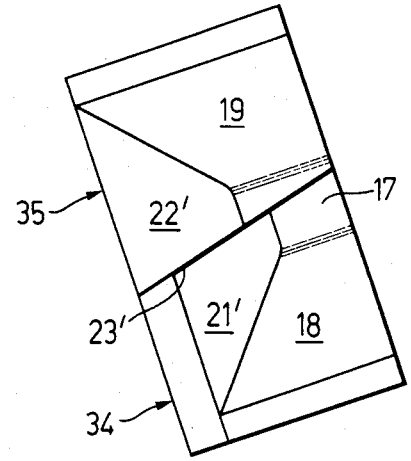
FIG. 11 is a somewhat perspective and top plan view of the cutter as shown in FIG. 8.

In case that the cutter 3 comprises two cutter halves, as illustrated for example in FIG. 8, then the cutter half 35 is removed from the end cutter head 1 or is lowered into the related slot 6 to such an extent that no part thereof projects beyond the end face 4. The end cutter head 1 is then, at the latest, chucked at a grinding machine, for instance of the type described in detail in the published European patent application No. 17,271. The end cutter head 1 is then adjusted in such a manner that the grinding wheel grinds or refaces the cutting face or surface 21' at the desired angle. After the cutting face 21' has been refaced, then the cutting face 22' is refaced. To that end, the cutter half 34 possibly must be lowered into the slot 6. However, depending upon the position of both of the cutting faces or surfaces 21' and 22' with respect to each other, it may be found that the grinding wheel does not endanger the cutting face 21' during refacing of the cutting face 22'. In such case both the cutter halves 34 and 35 may remain clamped within the end cutter head 1 in their definitive position. The end cutter head 1 is then adjusted on the grinding machine in such a way that, for instance, the flank clearance surface or face 19 can be refaced. Therefore, a grinding wheel 41 is used as will be evident from FIG. 14. During this step the top clearance face or surface 17 is simultaneously refaced together with the flank clearance face or surface 19. Subsequently, the end cutter head 1 is readjusted at the grinding machine in such a manner that the flank clearance surface or face 18 can be refaced. In conjunction therewith the top clearance face or surface 17 is again refaced. Thus, all of the cutting edges of the cutter 3 have been reground and the end cutter head 2 is ready for further use. It will be evident, that as to all of the cutters in the end cutter head, the same respective cutting face or flank clearance surface or face may be refaced with the same adjustment or setting of the end cutter head. Therefore, initially all of the cutting faces 21', then all of the cutting faces 22', and later the flank clearance surfaces or faces 19 of all cutters are refaced.

In case that the cutter 2 comprises a cutter or bar or rod-type cutter as shown in FIG. 12, then the cutter first has to be removed from the end cutter head 1. The cutting face or surface 21 then may be possibly manually refaced or by using specific grinding means of conventional design not shown here in greater detail. Depending upon the relative position of the cutting faces or surfaces 21 and 22, the cutting face 22 will have to be refaced in the same way, or however, the process is continued in the manner as described hereinbefore.

While there are shown and described present preferred embodiments of the invention, it is to be distinctly understood that the invention is not limited thereto, but may be otherwise variously embodied and practiced within the scope of the following claims.
ACCORDINGLY,
What I claim is:

1. An end cutter head for gear cutting machines, said end cutter head comprising:
   a body member containing at least one end face;
   cutters supported by said body member and projecting from said end face of said body member;
   each of said cutters having two cutting faces;
   said cutting faces being displaced with respect to each other;
   both of said cutting faces being bounded at one side thereof by a common separating face;
   each of said cutters being divided to form two separate cutter halves by means of said separating face;
   said cutters forming bar-type cutters;
   said bar-type cutters being arranged in said end cutter head for adjustment in a longitudinal direction of said bar-type cutters;
   said body member being provided with slots;
   said cutters being placed in said slots;
   each of said slots having a transversely extending groove;
   a locking device provided in each transversely extending groove;
   means on and coacting with said locking devices to retain each of said cutters in its associated slot;
   supporting faces to support said locking devices formed in each of said transversely extending grooves;
   said supporting faces extending at a predetermined angle towards said cutters; and
   each said transversely extending groove having an arcuate supporting face at which its related locking device is supported by means of said arcuate supporting face.

2. A cutter head for a gear-cutting machine, comprising:
   a cutter head body having at least one end face and an axis of rotation;
   at least one cutter blade having a longitudinal direction of extent;
   at least one slot formed in said cutter head body to support said at least one cutter blade with said longitudinal direction of extent substantially parallel to said axis of rotation;
   said cutter blade being adjustable in said longitudinal direction of extent and projecting from said at least one end face of said cutter head body;
   a clamping device in each said at least one slot to retain each said at least one cutter blade;
   a groove extending transversely in relation to each said at least one slot;
   at least two angled supporting lands formed in said clamping device and including a predetermined angle having an apex oriented toward said at least one cutter blade;
   at least two angled supporting lands formed in said groove to cooperate with said at least two angled lands of said clamping device to support said clamping device; and
   at least one clamping means on and cooperating with said clamping device to retain said at least one cutter blade in said at least one slot.

3. The cutter head as defined in claim 2, wherein:
   said at least two angled supporting lands of said clamping device and said at least two angled supporting lands of said groove are defined by a substantially arcuate surface extending substantially perpendicular to said at least one end face of said cutter head body.

4. An end cutter head for gear cutting machines, said end cutter head comprising:
   a body member containing at least one end face;
   cutters supported by said body member and projecting from said end face of said body member;
   said cutters forming bar-type cutters;
   said bar-type cutters being arranged in said end cutter head for adjustment in a longitudinal direction of said bar-type cutters;
   said body member being provided with slots;
   said cutters being placed in said slots;
   each of said slots having a transversely extending groove;
   a locking device provided in each transversely extending groove;
   means on and coacting with said locking devices to retain each of said cutters in its associated slot;
   supporting faces to support said locking devices formed in each of said transversely extending grooves; and
   said supporting faces extending at a predetermined slightly arrow-shaped angle with the tip of the arrow-shape directed towards said cutters.

5. The end cutter head as defined in claim 4, wherein:
   each said transversely extending groove has an arcuate supporting face at which its related locking device is supported by means of said arcuate supporting face.

* * * * *